J. R. WOOD.
TIRE.
APPLICATION FILED JULY 13, 1920.

1,354,449.

Patented Sept. 28, 1920.
2 SHEETS—SHEET 1.

J. R. Wood, Inventor

By C. A. Snow & Co.
Attorney

J. R. WOOD.
TIRE.
APPLICATION FILED JULY 13, 1920.

1,354,449.

Patented Sept. 28, 1920.
2 SHEETS—SHEET 2.

J. R. Wood, Inventor

By C. A. Snow & Co.
Attorney

UNITED STATES PATENT OFFICE.

JAMES R. WOOD, OF INDIANAPOLIS, INDIANA.

TIRE.

1,354,449.   Specification of Letters Patent.   Patented Sept. 28, 1920.

Application filed July 13, 1920. Serial No. 395,836.

*To all whom it may concern:*

Be it known that I, JAMES R. WOOD, a citizen of the United States, residing at Indianapolis, in the county of Marion and State of Indiana, have invented a new and useful Tire, of which the following is a specification.

This invention relates to vehicle tires primarily designed for use in connection with trucks and other vehicles for carrying heavy loads although it is to be understood that the tire can be employed as a substitute for any pneumatic tire. One of the objects of the invention is to provide a spring restrained sectional filler for a tire casing made of rubber or the like, the said filler being so constructed as to yield when subjected to pressure, thereby to absorb shocks similarly to a pneumatic tire.

A further object is to provide a sectional filler the parts of which can be assembled readily, which is durable and compact, and will not readily get out of order.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 2:
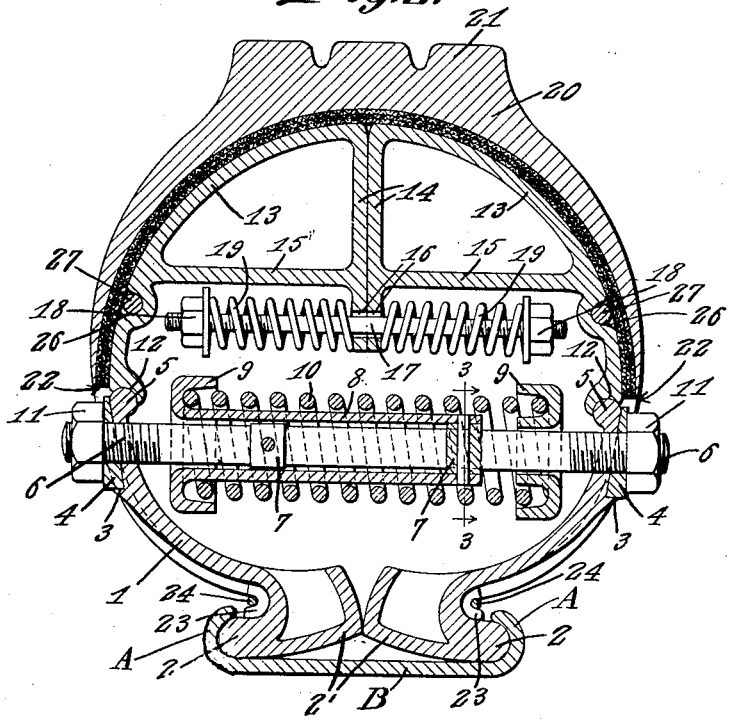
Fig. 2 is a section on an enlarged scale taken on line 2—2, Fig. 1.
Figure 3:
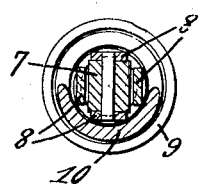
Fig. 3 is a section on line 3—3, Fig. 2.

Referring to the figures by characters of reference 1 designates a segmental plate the inner edge portion of which is out turned to form a rounded abutment or bead 2 adapted to engage the inturned flange A of a rim B. These abutments have inwardly extending spacing rockers 2' having rolling contact with each other. The segmental plate 1 is provided near its outer end and on its outer surface with a shoulder 3 constituting an abutment for a washer 4 and said outer end of the plate is rounded to form a bearing rib or enlargement 5. A series of these plates 1 is provided along each side of the tire, the plates of each series abutting and the plates of the two series being oppositely disposed as clearly indicated in Fig. 2. Engaging each plate 1 and its washer 4 is a screw 6 having an angular inner end portion 7 to opposite faces of which are attached parallel arms 8. The arms 8 extending from one screw are disposed at the sides of the space between the arms 8 extending from the other screw. Each pair of arms 8 is formed with a cup or abutment 9 and extending around all of the arms and bearing against the abutments is a coiled spring 10. Thus it will be seen that movement of the plates 1 of opposed series away from each other is retarded by the springs 10 because such spreading movement of the plates tends to draw the abutments 9 toward each other and, consequently, to compress the spring. The screws 6 are secured to the plates 1 in any manner desired, as by means of nuts 11 engaging the screws and bearing against the washers 4.

The rounded bearing portions 5 of the plates 1 are seated in sockets or grooves 12 formed in the inner edge portions of arcuate plates 13. Extending inwardly from the outer ends of these plates 13 are arms 14 connected to the side portions of the plates by braces 15. The inner ends of the arms 14 are provided with openings 16 and extending through these openings loosely is a tie rod 17 having nuts 18 adjustably mounted on its ends. Springs 19 are interposed between these nuts and the respective arms 14 and are adapted to hold the arms normally pressed together. Obviously should pressure be exerted inwardly against the meeting portions of the opposed plates 13 which extend in series around the tire, it will be apparent that these opposed plates will act as toggles, tending to swing the engaged plates apart against the action of the springs 10, the relative movement of the plates 13 being at the same time resisted by the springs 19. Thus a considerable cushioning action will be obtained. Where the tire is to be used on light vehicles one set of springs can be eliminated.

Figure 1:
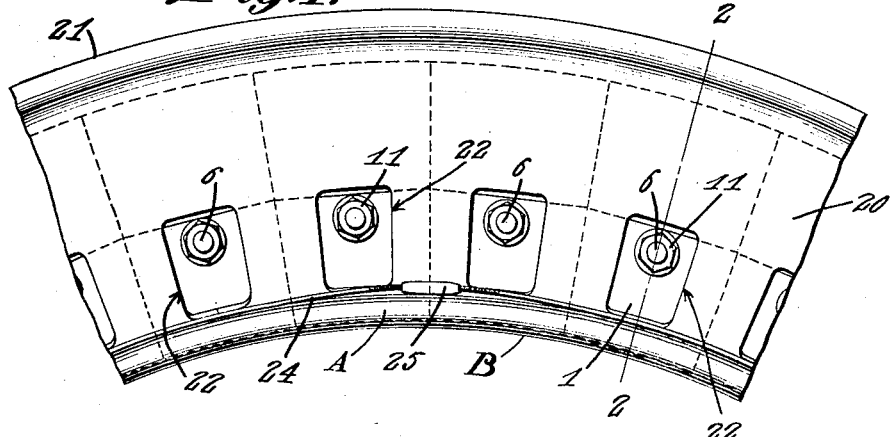
Figure 1 is a side elevation of a portion of a tire having the present improvements.

The core, which is made up of the plates 1 and 13 and the parts inclosed thereby is adapted to be housed within a casing 20 having a tread surface 21 of any desired construction and which casing is adapted to extend around the core portions of the sides of the casing being cut away, as at 22 to expose the nuts 11 as shown in Fig. 1. The free edges of the casing form beads 23 adapted to be engaged by holding wires 24 and the ends of the wires can be connected by turn buckles 25. Thus after the parts have been assembled and seated in a rim B, the wires 24 can be applied and tightened and will act to hold the parts properly assembled. The casing 20 closes the gaps if any, formed between the meeting ends of the plates 1 and between the meeting ends of the plates 13 so that dirt and moisture are thus kept out of the interior of the tire.

If desired ribs 26 can be extended inwardly from the side portions of the plates 13, there being rings 27 seated in these ribs for tying the plates 13 to the plates 1, thus to offset the action of centrifugal force.

Figure 4:
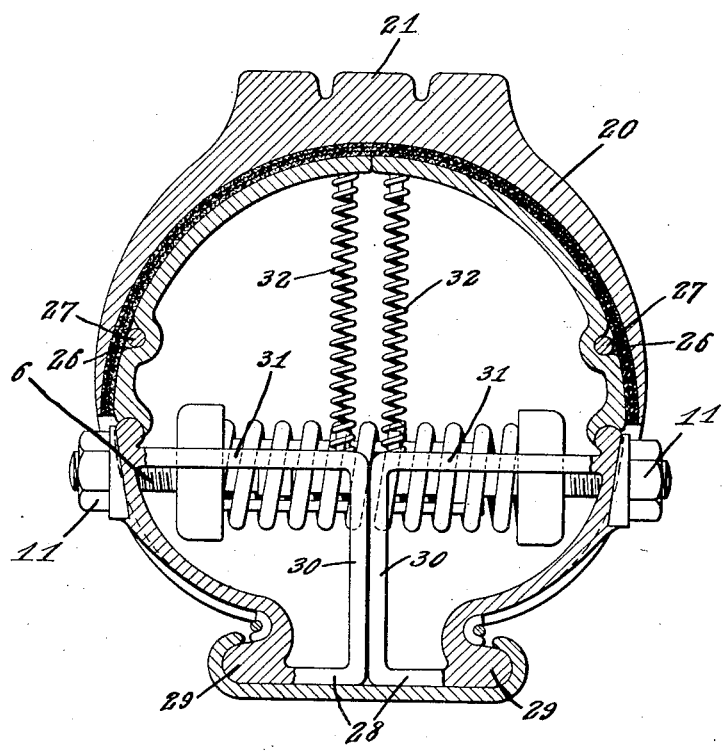
Fig. 4 is a section through a modified form of tire.

If desired, and as shown in Fig. 4, the abutments 28 extending inwardly from the beads 29 can be formed with normally contacting extensions 30 connected to the plates 1 by lateral braces 31. These abutments 30 and braces 31 are arranged between the springs 10 and the angle portions of the abutments 30 and braces 31 may be connected to the outer meeting edges of the plates 13 by springs 32.

What is claimed is:

1. A vehicle tire including opposed annular series of inner side plates, means interposed therebetween for yieldingly restraining them against outward relative movement, opposed annular series of outer side plates tiltably mounted on the inner side plates, means extending inwardly from the opposed outer side plates constituting abutments, yielding means carried by the abutments for restraining the outward swinging movement of the outer side plates relative to each other, and a casing housing all of the plates.

2. In a tire the combination with a flexible casing having a tread portion, of a core housed within the casing and including opposed annular series of rim engaging plates, oposed annular series of outer side plates tiltably mounted on the respective rim engaging plates, means carried by the outer side plates for limiting their relative inward movement and retarding their relative outward movement, and a resilient connection between the opposed rim engaging plates.

3. A tire including a flexible casing having a tread portion, and a core for said casing comprising opposed annular series of abutting plates, out turned rim engaging portions upon the plates, resilient means connecting the opposed plates for retarding their outward movement in opposite directions respectively, opposed annular series of outer side plate tiltably mounted on the rim engaging plates, abutments extending inwardly from the meeting end portions of the opposed outer side plates.

4. A tire including a flexible casing having a tread portion, and a core for said casing comprising opposed annular series of abutting plates, out turned rim engaging portions upon the plates, resilient means connecting the opposed plates for retarding their outward movement in opposite directions respectively, opposed annular series of outer side plates tiltably mounted on the rim engaging plates, abutments extending inwardly from the meeting end portions of the opposed outer side plates, and yielding means for holding the abutments normally in contact.

5. A tire including a flexible casing having a tread portion, and a core for said casing comprising opposed annular series of abutting plates, out turned rim engaging portions upon the plates, resilient means connecting the opposed plates for retarding their outward movement in opposite directions respectively, opposed annular series of outer side plates tiltably mounted on the rim engaging plates, abutments extending inwardly from the meeting end portions of the opposed outer side plates, and adjustable means engaging the free edge portions of the casing for binding them upon the rim engaging face of the core to hold the tire assembled with the rim.

6. In a tire the combination with a casing having a tread portion, of a core including opposed annular series of rim engaging plates, each of said plates having an out turned rim engaging portion, the plates of each series having abutting ends, screws adjustably connected to the plates and extending inwardly therefrom, lapping arms extending from the screws, abutments carried by the arms, springs mounted upon the arms and between and bearing against the abutments, means engaging the screws and exposed through the casing for adjusting the tension of the springs, opposed series of outer side plates tiltably mounted on the respective rim engaging plates, and yielding connections between the outer side plates of opposed series.

In testimony that I claim the foregoing as my own, I have hereto affixed my signature in the presence of two witnesses.

JAMES R. WOOD.

Witnesses:
 WM. H. BETTCHER,
 R. C. NEWLIN.